US008521827B2

(12) United States Patent
Martin

(10) Patent No.: US 8,521,827 B2
(45) Date of Patent: Aug. 27, 2013

(54) PRESENTATION OF INFORMATION TO END-USERS

(75) Inventor: Anthony G. Martin, Los Altos, CA (US)

(73) Assignee: Carhamm Ltd., LLC, Dover, DE (US)

( * ) Notice: Subject to any disclaimer, the term of this patent is extended or adjusted under 35 U.S.C. 154(b) by 1375 days.

(21) Appl. No.: 10/061,107

(22) Filed: Jan. 25, 2002

(65) Prior Publication Data
US 2003/0145060 A1 Jul. 31, 2003

Related U.S. Application Data

(60) Provisional application No. 60/347,921, filed on Oct. 18, 2001.

(51) Int. Cl.
*G06F 15/16* (2006.01)
*G06F 3/00* (2006.01)
(52) U.S. Cl.
USPC .......................................... 709/207; 715/738
(58) Field of Classification Search
USPC ......... 709/201, 203, 206, 238, 207; 345/764, 345/749; 707/1; 715/808
See application file for complete search history.

(56) References Cited

U.S. PATENT DOCUMENTS

| 5,327,554 A | 7/1994 | Palazzi et al. |
| 5,446,919 A | 8/1995 | Wilkins |
| 5,530,852 A | 6/1996 | Meske et al. |
| 5,584,025 A | 12/1996 | Keithley et al. |
| 5,615,325 A | 3/1997 | Peden |
| 5,642,484 A | 6/1997 | Harrison, III et al. |
| 5,649,186 A | 7/1997 | Ferguson |
| 5,680,562 A * | 10/1997 | Conrad et al. ................. 715/797 |
| 5,704,017 A | 12/1997 | Heckerman et al. |
| 5,717,923 A | 2/1998 | Dedrick |
| 5,721,908 A | 2/1998 | Lagarde et al. |
| 5,754,939 A | 5/1998 | Herz et al. |

(Continued)

FOREIGN PATENT DOCUMENTS

| EP | 1045547 | 10/2000 |
| EP | 1154611 | 11/2001 |

(Continued)

OTHER PUBLICATIONS

IRTORG—Internet Related Technologies, "irt.org—JavaScript Windows FAQ Knowledge Base", Jun. 3, 2000. Webpage [online] [retrieved on Dec. 19, 2005]. Retrieved from the Internet<URL:http://web.archive.org/web/20000619232700/developer.irt.org/script/window.htm>.

(Continued)

*Primary Examiner* — Shirley Zhang
(74) *Attorney, Agent, or Firm* — Brundidge & Stanger, P.C.

(57) ABSTRACT

In one embodiment, a message containing message information is received in an end-user's computer. A portion of the message information is first displayed in a caption area. Preferably, the caption area only has enough information to attract the end-user's attention, or provide a hint of the information contained in a subsequently displayed slider window area. A slider window area containing another portion of the message information is displayed after the caption area. Typically, the slider window area is larger than the caption area and contains more information. If the end-user has not acted on either the caption area or the slider window area, indicating that she is not interested in the presented message information, the slider window area automatically closes after a predetermined amount of time.

30 Claims, 11 Drawing Sheets

(56) References Cited

U.S. PATENT DOCUMENTS

| | | |
|---|---|---|
| 5,758,257 A | 5/1998 | Herz et al. |
| 5,761,662 A | 6/1998 | Dasan |
| 5,793,972 A | 8/1998 | Shane |
| 5,794,259 A | 8/1998 | Kikinis |
| 5,819,092 A | 10/1998 | Ferguson et al. |
| 5,835,087 A | 11/1998 | Herz et al. |
| 5,848,396 A | 12/1998 | Gerace |
| 5,854,897 A | 12/1998 | Radziewicz et al. |
| 5,862,325 A | 1/1999 | Reed et al. |
| 5,886,683 A | 3/1999 | Tognazzini et al. |
| 5,890,152 A | 3/1999 | Rapaport et al. |
| 5,893,118 A | 4/1999 | Sonderegger |
| 5,898,434 A | 4/1999 | Small et al. |
| 5,907,838 A | 5/1999 | Miyasaka et al. |
| 5,918,014 A | 6/1999 | Robinson |
| 5,920,697 A | 7/1999 | Masters et al. |
| 5,933,811 A | 8/1999 | Angles et al. |
| 5,937,037 A | 8/1999 | Kamel et al. |
| 5,937,392 A | 8/1999 | Alberts |
| 5,948,061 A | 9/1999 | Merriman et al. |
| 5,951,300 A | 9/1999 | Brown |
| 5,978,807 A | 11/1999 | Mano et al. |
| 5,978,833 A | 11/1999 | Pashley et al. |
| 5,991,735 A | 11/1999 | Gerace |
| 5,999,526 A | 12/1999 | Garland et al. |
| 6,006,252 A | 12/1999 | Wolfe |
| 6,011,537 A | 1/2000 | Slotznick |
| 6,026,368 A | 2/2000 | Brown et al. |
| 6,029,141 A | 2/2000 | Bezos et al. |
| 6,029,182 A | 2/2000 | Nehab et al. |
| 6,029,195 A | 2/2000 | Herz |
| 6,047,327 A | 4/2000 | Tso et al. |
| 6,073,105 A | 6/2000 | Sutcliffe et al. |
| 6,073,241 A | 6/2000 | Rosenberg et al. |
| 6,076,166 A | 6/2000 | Moshfeghi et al. |
| 6,088,731 A | 7/2000 | Kiraly et al. |
| 6,119,098 A | 9/2000 | Guyot et al. |
| 6,133,912 A | 10/2000 | Montero |
| 6,133,918 A | 10/2000 | Conrad et al. |
| 6,134,532 A | 10/2000 | Lazarus et al. |
| 6,141,010 A | 10/2000 | Hoyle |
| 6,144,944 A | 11/2000 | Kurtzman, II et al. |
| 6,151,596 A | 11/2000 | Hosomi |
| 6,157,924 A | 12/2000 | Austin |
| 6,182,066 B1 | 1/2001 | Marques |
| 6,183,366 B1 | 2/2001 | Goldberg et al. |
| 6,185,558 B1 | 2/2001 | Bowman |
| 6,202,093 B1 | 3/2001 | Bolam et al. |
| 6,222,520 B1 | 4/2001 | Gerszberg et al. |
| 6,253,188 B1 | 6/2001 | Witek et al. |
| 6,269,361 B1 | 7/2001 | Davis et al. |
| 6,280,043 B1 | 8/2001 | Ohkawa |
| 6,285,987 B1 | 9/2001 | Roth et al. |
| 6,286,043 B1 | 9/2001 | Cuomo et al. |
| 6,286,045 B1 | 9/2001 | Griffith et al. |
| 6,295,061 B1 * | 9/2001 | Park et al. ............. 345/764 |
| 6,297,819 B1 | 10/2001 | Furst |
| 6,311,194 B1 | 10/2001 | Sheth et al. |
| 6,314,451 B1 | 11/2001 | Landsman et al. |
| 6,314,457 B1 | 11/2001 | Schema et al. |
| 6,317,761 B1 | 11/2001 | Landsman et al. |
| 6,321,209 B1 | 11/2001 | Pasquali |
| 6,324,569 B1 | 11/2001 | Ogilvie et al. |
| 6,347,398 B1 | 2/2002 | Parthasarathy et al. |
| 6,351,279 B1 | 2/2002 | Sawyer |
| 6,381,742 B2 | 4/2002 | Forbes et al. |
| 6,401,075 B1 | 6/2002 | Mason et al. |
| 6,434,745 B1 | 8/2002 | Conley, Jr. et al. |
| 6,438,215 B1 | 8/2002 | Skladman et al. |
| 6,446,128 B1 | 9/2002 | Woods et al. |
| 6,487,538 B1 | 11/2002 | Gupta et al. |
| 6,502,076 B1 | 12/2002 | Smith |
| 6,526,411 B1 | 2/2003 | Ward |
| 6,539,375 B2 | 3/2003 | Kawasaki |
| 6,584,479 B2 * | 6/2003 | Igarashi et al. ............. 715/205 |
| 6,601,041 B1 | 7/2003 | Brown et al. |
| 6,606,652 B1 | 8/2003 | Cohn et al. |
| 6,622,168 B1 | 9/2003 | Datta |
| 6,678,866 B1 * | 1/2004 | Sugimoto et al. ............. 715/203 |
| 6,721,741 B1 | 4/2004 | Eyal et al. |
| 6,760,916 B2 | 7/2004 | Holtz et al. |
| 6,801,909 B2 | 10/2004 | Delgado et al. |
| 6,892,226 B1 | 5/2005 | Tso et al. |
| 6,957,390 B2 | 10/2005 | Tamir et al. |
| 6,976,090 B2 | 12/2005 | Ben-Shaul et al. |
| 6,990,633 B1 | 1/2006 | Miyasaka |
| 6,993,532 B1 | 1/2006 | Platt et al. |
| 7,003,734 B1 * | 2/2006 | Gardner et al. ............. 715/808 |
| 7,065,550 B2 | 6/2006 | Raghunandan |
| 7,133,924 B1 | 11/2006 | Rosenberg et al. |
| 7,149,791 B2 | 12/2006 | Sears et al. |
| 7,155,729 B1 * | 12/2006 | Andrew et al. ............. 719/318 |
| 7,254,547 B1 | 8/2007 | Beck et al. |
| 7,454,364 B2 | 11/2008 | Shkedi |
| 7,464,155 B2 | 12/2008 | Mousavi et al. |
| 7,743,340 B2 * | 6/2010 | Horvitz et al. ............. 715/808 |
| 2001/0037240 A1 | 11/2001 | Marks et al. |
| 2001/0037488 A1 | 11/2001 | Lee |
| 2002/0002483 A1 | 1/2002 | Siegel et al. |
| 2002/0008703 A1 | 1/2002 | Merrill et al. |
| 2002/0010626 A1 | 1/2002 | Agmoni |
| 2002/0019763 A1 | 2/2002 | Linden et al. |
| 2002/0019834 A1 | 2/2002 | Vilcauskas, Jr. et al. |
| 2002/0035568 A1 | 3/2002 | Benthin |
| 2002/0040374 A1 | 4/2002 | Kent |
| 2002/0049633 A1 | 4/2002 | Pasquali |
| 2002/0052785 A1 | 5/2002 | Tenenbaum |
| 2002/0053078 A1 | 5/2002 | Holtz et al. |
| 2002/0054089 A1 | 5/2002 | Nicholas |
| 2002/0057285 A1 * | 5/2002 | Nicholas, III ............. 345/700 |
| 2002/0059099 A1 | 5/2002 | Coletta |
| 2002/0065802 A1 | 5/2002 | Uchiyama |
| 2002/0085027 A1 * | 7/2002 | Kim ............. 345/738 |
| 2002/0087499 A1 | 7/2002 | Stockfisch |
| 2002/0094868 A1 | 7/2002 | Tuck et al. |
| 2002/0128904 A1 | 9/2002 | Carruthers et al. |
| 2002/0128908 A1 | 9/2002 | Levin et al. |
| 2002/0154163 A1 * | 10/2002 | Melchner ............. 345/749 |
| 2002/0156812 A1 | 10/2002 | Krasnoiarov et al. |
| 2002/0169670 A1 | 11/2002 | Barsade et al. |
| 2002/0171682 A1 | 11/2002 | Frank et al. |
| 2002/0175947 A1 * | 11/2002 | Conrad et al. ............. 345/781 |
| 2002/0194151 A1 * | 12/2002 | Fenton et al. ............. 707/1 |
| 2003/0005134 A1 | 1/2003 | Martin et al. |
| 2003/0011639 A1 * | 1/2003 | Webb ............. 345/808 |
| 2003/0014304 A1 | 1/2003 | Calvert et al. |
| 2003/0041050 A1 | 2/2003 | Smith et al. |
| 2003/0050863 A1 | 3/2003 | Radwin |
| 2003/0052913 A1 | 3/2003 | Barile |
| 2003/0110080 A1 | 6/2003 | Tsutani et al. |
| 2003/0176931 A1 | 9/2003 | Pednault et al. |
| 2003/0182184 A1 | 9/2003 | Strasnick et al. |
| 2003/0220091 A1 | 11/2003 | Farrand et al. |
| 2003/0229542 A1 | 12/2003 | Morrisroe |
| 2004/0030798 A1 | 2/2004 | Anderson et al. |
| 2004/0044677 A1 | 3/2004 | Huper-Graff et al. |
| 2004/0098449 A1 | 5/2004 | Bar-Lavi et al. |
| 2004/0162738 A1 | 8/2004 | Sanders et al. |
| 2004/0163101 A1 | 8/2004 | Swix et al. |
| 2004/0167928 A1 | 8/2004 | Anderson et al. |
| 2004/0181604 A1 | 9/2004 | Immonen |
| 2004/0193488 A1 | 9/2004 | Khoo et al. |
| 2004/0210533 A1 | 10/2004 | Picker et al. |
| 2004/0267723 A1 | 12/2004 | Bharat |
| 2005/0038819 A1 | 2/2005 | Hicken et al. |
| 2005/0102282 A1 | 5/2005 | Linden |
| 2005/0125382 A1 | 6/2005 | Karnawat et al. |
| 2005/0203796 A1 | 9/2005 | Anand et al. |
| 2005/0204148 A1 | 9/2005 | Mayo |
| 2005/0216572 A1 | 9/2005 | Tso et al. |
| 2006/0136528 A1 | 6/2006 | Martin et al. |
| 2006/0136728 A1 | 6/2006 | Gentry et al. |
| 2006/0235965 A1 | 10/2006 | Bennett et al. |
| 2006/0253432 A1 | 11/2006 | Eagle et al. |

FOREIGN PATENT DOCUMENTS

| | | |
|---|---|---|
| JP | 3-43825 A | 2/1991 |
| JP | 11066099 | 3/1999 |
| JP | 2001-147894 A | 5/2001 |
| JP | 20010222535 | 8/2001 |
| JP | 2002024221 | 1/2002 |
| JP | 2003058572 | 2/2003 |
| JP | 20030271647 | 9/2003 |
| WO | WO 99/59097 A | 11/1999 |
| WO | WO 00/04434 | 1/2000 |
| WO | WO 01/03028 | 1/2001 |
| WO | WO 01/15052 | 3/2001 |
| WO | WO 01/39024 A2 | 5/2001 |
| WO | WO 01/69929 | 9/2001 |
| WO | WO 01/90917 | 11/2001 |
| WO | WO 02/44869 A2 | 6/2002 |

OTHER PUBLICATIONS

Heinle et al., "Designing with JavaScript Creating Dynamic Web Pages", Sep. 1997, pp. 1-33, 46, 83.

Codelifter.com: JavaScript Index Windows and Frames, [online] [retrieved on Dec. 19, 2005]. Retrieved from the Internet<URL:// http://www.codelifater.com/main/javascript/index_windowframes. html>.

Supplementary European Search Report for EP Application No. 02 77 8589 (2 sheets).

Keys, "Every Possible Internet Advertisement Drastic Increase of Click Through Rate by Interactivity and Multimedia", Nikkei Internet Technology, Jan. issue of 1999, Dec. 22, 1998, vol. 18, pp. 118-127.

Takahashi, "JavaScript Lab. Safe Control of Pop-up Windows", Web Designing (separate volume of Mac Fan of Jun. 10 issue), Mainichi Communications Inc., Jun. 10, 2001, No. 9 vol. 12, pp. 86-89.

Japanese Patent Office, Official Action issued Dec. 17, 2010, mailed Dec. 27, 2010 in Japanese Patent Application No. 2007-528053 (non-official translation), 7 pgs.

ACM Portal USPTO Search, "Communications of the ACM: vol. 52, Issue 1", Association for Computing Machinery, dated Jan. 2009, 1 page.

Aggarwal, Charu C. et al. 2001. Intelligent Crawling on the World Wide Web with Arbitrary Predicates. ACM, pp. 96-105.

BackWeb Technologies Ltd., BackWEB User's Guide, 1997, [48 pgs.].

Claypool, et al., Inferring User Interest, Worcester Polytechnic Inst., IEEE Internet Computing, Nov.-Dec. 2001, pp. 32-39 [8 pgs.].

comScore Marketing Solutions and Media Metrix (9 sheets), webpage) [online), 2003 comScore Networks, Inc. (retrieved on Oct. 8, 2003), retrieved from the internet: <URL:http://vAvw.comscore. com>.

Copernic, Copernic: Software to Search, Find, and Manage Information, Copernic Technologies, Inc. 2004, 2 pgs. (retrieved on Apr. 6, 2004). Retrieved from the Internet<URL:http://www.copernic.com/ en/index.html>.

Diligenti, Michelangelo et al. 2004. A Unified Probalistic Framework for Web Page Scoring Systems. IEEE, vol. 16, No. 1. Jan. 2004, pp. 4-16.

Dogpile, Dogpile Web Search Home Page, InfoSpace, Inc. 2004, p. 1 of 1, (retrieved on Apr. 1, 2004). Retrieved from the Internet: <URL:http://www.dogpile.com.html>.

European Search Report for Application No. EP 06 01 3103 (2 sheets).

Favela, Jesus et al. 1997. Image-Retrieval Agent: Integrating Image Content and Text. IEE, vol. 1.14, pp. 36-39.

Foreign Examination Report cited in corresponding Great Britain application, GB0724938.6, dated Jan 11, 2010, 2 pages.

Google Search, "Result Search Query Build Search Engine Index Using Gather Consumer Navigate Search", http://scholar.google. com/scholar, dated Apr. 7, 2010, 3 pages.

Hancock, Wayland, "A new way to get information from the Internet," American Agent & Broker, Nov. 1997, 69, 11, pp. 65-66 [2 pgs.].

Hongyu Liu et al., "Focused Crawling by Learning HMM from User's Topic-Specific Browsing" Proceedings of the IEEE/WIC/ ACM International Conference on Web Intelligence (WI '04) 0-7695-2100-2/04.

Hun, Ke et al. 2003. A Probabilistic Model for Intelligent Web Crawlers. IEEE, pp. 278-282.

International Preliminary Report on Patentability and Written Opinion in PCT Appln. No. PCT/US2005/029615, mailed Mar. 9, 2006.

International Preliminary Report on Patentability and Written Opinion in PCT Appln. No. PCT/US2006/009954, mailed Aug. 30, 2006.

International Search Report and Wrtitten Opinion in PCT Appln. No. PCT/US2006/025103, mailed Jan. 29, 2008.

International Search Report in EP Appln. No. 05802579.2-1527, dated May 2, 2008.

International Search Report in PCT Appln. No. PCT/US2005/ 029615, mailed Mar. 9, 2006.

International Search Report in PCT Appln. No. PCT/US2006/ 009954, mailed Aug. 30, 2006.

International Search Report in PCT Appln. No. PCT/US2007/ 061944, mailed Feb. 14, 2008.

Kurohashi, Sadao, et al. 1997. The Method for Detecting Important Descriptions of a Word Based on its Density Distribution in Text. Information Processing Society of Japan. vol. 38, Issue No. 4 (Apr. 15, 1997), pp. 845-854.

Leuski, Anton et al. 2000. Lighthouse: Showing the Way to Relevant Information. IEEE, Oct. 2000, pp. 125-129.

Metacrawler, Web Search Home Page—MetaCrawler, InfoSpace, Inc. 2004, p. 1 of 1 (retrieved on Apr. 6, 2004), Retrieved from the internet: <URL:http://www.metacrawler.com.html>.

Mitchell, T., "Decision Tree Learning Based on Machine Learning" (Apr. 5, 2003), lecture slides for textbook Machine Learning, McGraw Hill, 1997, pp. 46-74 [29 pgs.].

Montgomery, Alan et al., Learning About Customers Without Asking, Carnegie Mellon University, Tepper School of Business, Jan. 2002 [35 pgs.].

Netscape Communications Corp., Netcaster Developer's Guide, Netscape Communicator, Sep. 25, 1997 [112 pgs.].

NielsenllNetRatings (24 sheets), webpage [online), 2003 NetRatings, Inc. (retrieved on Oct. 8, 2003), retrieved from the internet: <URL:http://www.nielsen-netratings.com>.

Nilsson, B. A., and Robb, J., "Invasion of the Webcasters," PC World, vol. 15, No. 9 (Sep. 1997) p. 204-216 [9 pgs.].

Office Action mailed Oct. 10, 2007 from U.S. Appl. No. 11/207,590, filed Aug. 19, 2005.

Office Action mailed Sep. 13, 2006 from U.S. Appl. No. 10/700,820, filed Nov. 4, 2003.

Office Action mailed Oct. 16, 2008 from U.S. Appl. No. 11/207,590, filed Aug. 19, 2005.

Office Action mailed Sep. 16, 2004 from U.S. Appl. No. 10/056,932, filed Jan. 25, 2002.

Office Action mailed Mar. 18, 2005 from U.S. Appl. No. 10/056,932, filed Jan. 25, 2002.

Office Action mailed Jun. 22, 2009 from U.S. Appl. No. 11/207,590, filed Aug. 19, 2005.

Office Action mailed Jun. 24, 2008 from U.S. Appl. No. 11/207,592, filed Aug. 19, 2005.

Office Action mailed May 24, 2007 from U.S. Appl. No. 10/700,820, filed Nov. 4, 2003.

Office Action mailed Apr. 25, 2006 from U.S. Appl. No. 10/700,820, filed Nov. 4, 2003.

Office Action mailed Feb. 25, 2009 from U.S. Appl. No. 11/207,592, filed Aug. 19, 2005.

Office Action mailed Dec. 26, 2006 from U.S. Appl. No. 10/700,820, filed Nov. 4, 2003.

Office Action mailed Mar. 26, 2010 from U.S. Appl. No. 11/207,590, filed Aug. 19, 2005.

Office Action mailed Jul. 27, 2005 from U.S. Appl. No. 10/056,932, filed Jan. 25, 2002.

Office Action mailed Oct. 27, 2010 from U.S. Appl. No. 11/207,590, filed Aug. 19, 2005.

Office Action mailed Sep. 27, 2007 from U.S. Appl. No. 11/207,592, filed Aug. 19, 2005.

Office Action mailed Nov. 28, 2006 from U.S. Appl. No. 10/227,168, filed Aug. 23, 2002.
Office Action mailed Jul. 3, 2006 from U.S. Appl. No. 10/227,168, filed Aug. 23, 2002.
Office Action mailed Sep. 5, 2003 from U.S. Appl. No. 10/056,932, filed Jan. 25, 2002.
Office Action mailed May 7, 2004 from U.S. Appl. No. 10/056,932, filed Jan. 25, 2002.
Office Action mailed Oct. 19, 2007 from U.S. Appl. No. 11/207,589, filed Aug. 19, 2005.
Otsuka, Shingo, et al. 2004. The Analysis of Users Behavior Using Global Web Access Logs. IPSJ SIG Technical Report, vol. 2004 No. 71 (Jul. 13, 2004), pp. 17-24.
PCT International Preliminary Report on Patentability, dated Jan. 9, 2008, for International Application No. PCT/US06/023386.
PCT International Search Report and Written Opinion dated Feb 9, 2007, for International Application No. PCT/US07/061944.
PCT International Search Report and Written Opinion dated Jul. 12, 2007, for International Application No. PCT/US06/023386.
PCT International Search Report and Written Opinion dated Jul. 26, 2007, for International Application No. PCT/US06/025102.
PCT International Search Report and Written Opinion dated Jun. 28, 2006, for International Application No. PCT/US06/025103.
PCT International Search Report dated Jan 23, 2007, for International Application No. PCT/US06/025104.
Shopping with WhenUShop, Webpage [on-line]; WhenU.com [retrieved on Mar. 19, 2002]. Retrieved from the Internet: URL:http://www.whenu.com.
SideStep, The Traveler's Search Engine; Webpage (online) (retrieved on Oct. 7, 2004); retrieved from the Internet: <URL:http://www.sidestep.com/main.html.
Soumen Chakrabarti et al., "Focused Crawling: A New Approach to Top-Specific Web Resource Discovery" Computer Networks 31 (1999), pp. 1623-1640.
Supplemental Notice of Allowability from U.S. Appl. No. 11/207,589 filed Aug. 19, 2005.
Visual Search ToolBar—Graphically Enhance Search Results, 2004 Viewpoint Corporation; Webpage [online] [retrieved on Oct. 7, 2004]; retrieved from the Internet: <URL:http://www.viewpoint.com/pub/toolbar/download.html.

* cited by examiner

PRESENTATION OF INFORMATION TO END-USERS

CROSS REFERENCE TO RELATED APPLICATIONS

This application claims the benefit of U.S. Provisional Application No. 60/347,921, filed Oct. 18, 2001 by United States Postal Service Express Mail Serial No. EL701362699US, entitled, "SYSTEM METHOD AND COMPUTER PROGRAM PRODUCT FOR COLLECTIG INFORMATION ABOUT A NETWORK USER" and which is incorporated by reference herein.

BACKGROUND OF THE INVENTION

1. Field of the Invention

The present invention relates generally to computer technology, and more particularly to methods, apparatus, and systems for displaying information.

2. Description of the Background Art

A computer user, hereinafter referred to as "end-user", typically receives information from the computer via a peripheral device such as a display monitor or a sound device. For example, a notification text box may be displayed on the monitor after the completion of a task. As another example, a beeping sound may be emitted by the sound device in the event of an unrecoverable error.

Computer networks allow remotely located computers to pass messages to one another. These messages may contain various types of information. Typically, messages that pertain solely to the processing aspects of the computer (e.g., machine-related information) are processed without alerting the end-user, while those directed to the end-user are displayed on the monitor for viewing. On the Internet, for example, an end-user gets bombarded with all sorts of messages as she navigates from one website to another. Most of these messages contain advertising information and are prominently displayed on the monitor, supposedly to attract the end-user's attention. Typically, these advertising messages are also designed such that the end-user has to take some action in order to get rid of them or view their contents. However, instead of getting the end-user's attention by prominently displaying the message or forcing the end-user to act on the message, the end-user usually gets annoyed and, as a result, instinctively removes the message without reading it.

From the foregoing, a more effective technique of presenting information to end-user is highly desirable.

SUMMARY

The present invention relates to an improved technique for presenting information. The present invention may be used in a variety of applications including, without limitation, advertising over the Internet, network administration, client-server communications, and any application requiring presentation of information to an end-user.

In one embodiment, a message containing message information is received in an end-user's computer. The message information may include text, rich content, or a combination of both. A portion of the message information is first displayed in a caption area. Preferably, the caption area only has enough information to attract the end-user's attention, or provide a hint of the information contained in a subsequently displayed slider window area. This helps keep the size of the caption area to a minimum, thereby minimizing impact on the end-user's current activity.

In this embodiment, a slider window area containing another portion of the message information is displayed after the caption area. The slider window area may be displayed after a predetermined amount of time, or in response to the end-user acting on the caption area (e.g., by clicking on or moving a cursor over the caption area). Typically, the slider window area is larger than the caption area and contains more information. If the end-user has not acted on either the caption area or the slider window area, indicating that she is not interested in the presented message information, the slider window area automatically closes after a predetermined amount of time. Thus, the end-user can go about her activity without having to act on messages that do not interest her. In one embodiment involving the Internet, both the caption area and the slider window area are automatically closed when the end-user navigates to another web page.

These and other features and advantages of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of system components and/or methods, to provide a thorough understanding of embodiments of the invention. One skilled in the relevant art will recognize, however, that the invention can be practiced without one or more of the specific details, or with other systems, methods, components, materials, parts, and/or the like. In other instances, well-known structures, materials, or operations are not shown or described in detail to avoid obscuring aspects of the invention.

Figure 1:
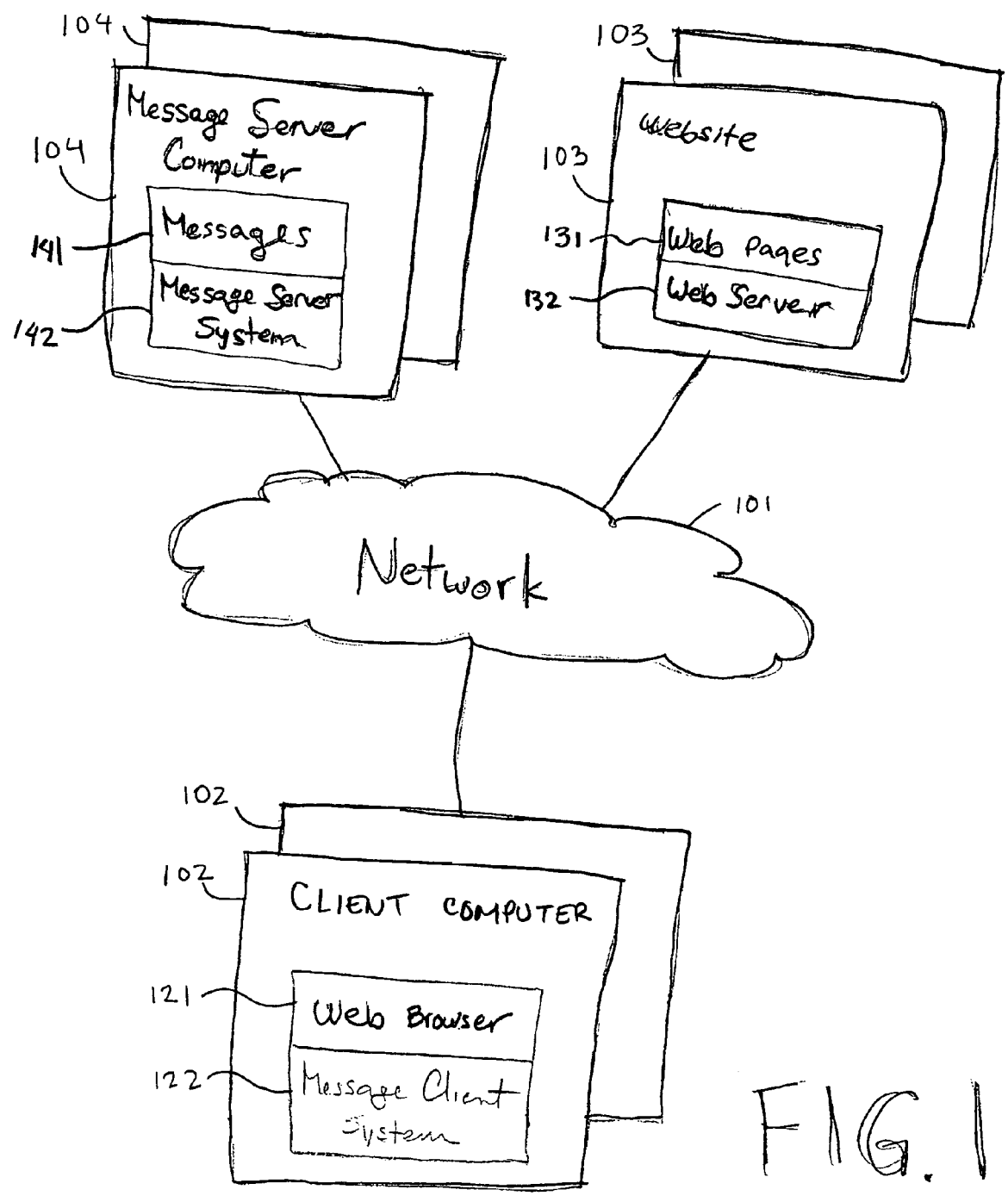
FIG. 1 shows a schematic diagram of a computer network in accordance with an embodiment of the present invention.

Referring to FIG. 1, there is shown a computer network in accordance with an embodiment of the present invention. As shown in FIG. 1, a computer network 101 couples together one or more client computers 102, one or more websites 103, one or more message server computers 104, and other computers not specifically shown. In this embodiment, network 101 is a public network such as the Internet. However, the present invention is not so limited and may be used in any type of network, including any client-server network.

A client computer 102 may be any type of computer that provides an end-user access to a network. In this embodiment, client computer 102 is a personal computer running either the Microsoft Windows™, Apple Macintosh™, Linux, or UNIX operating system. Client computer 102 includes a web browser 121 such as the Microsoft Internet Explore™ or Netscape Navigator™. An end-user on client computer 102 employs web browser 121 for viewing web pages stored on various websites on network 101. Client computer 102 also includes a message client system 122, which includes computer-readable program code (i.e., a set of computer instructions also known as "software") for receiving, processing, and displaying various messages received over network 101. Message client system 122 is further discussed later on below in connection with FIG. 3.

Figure 2:
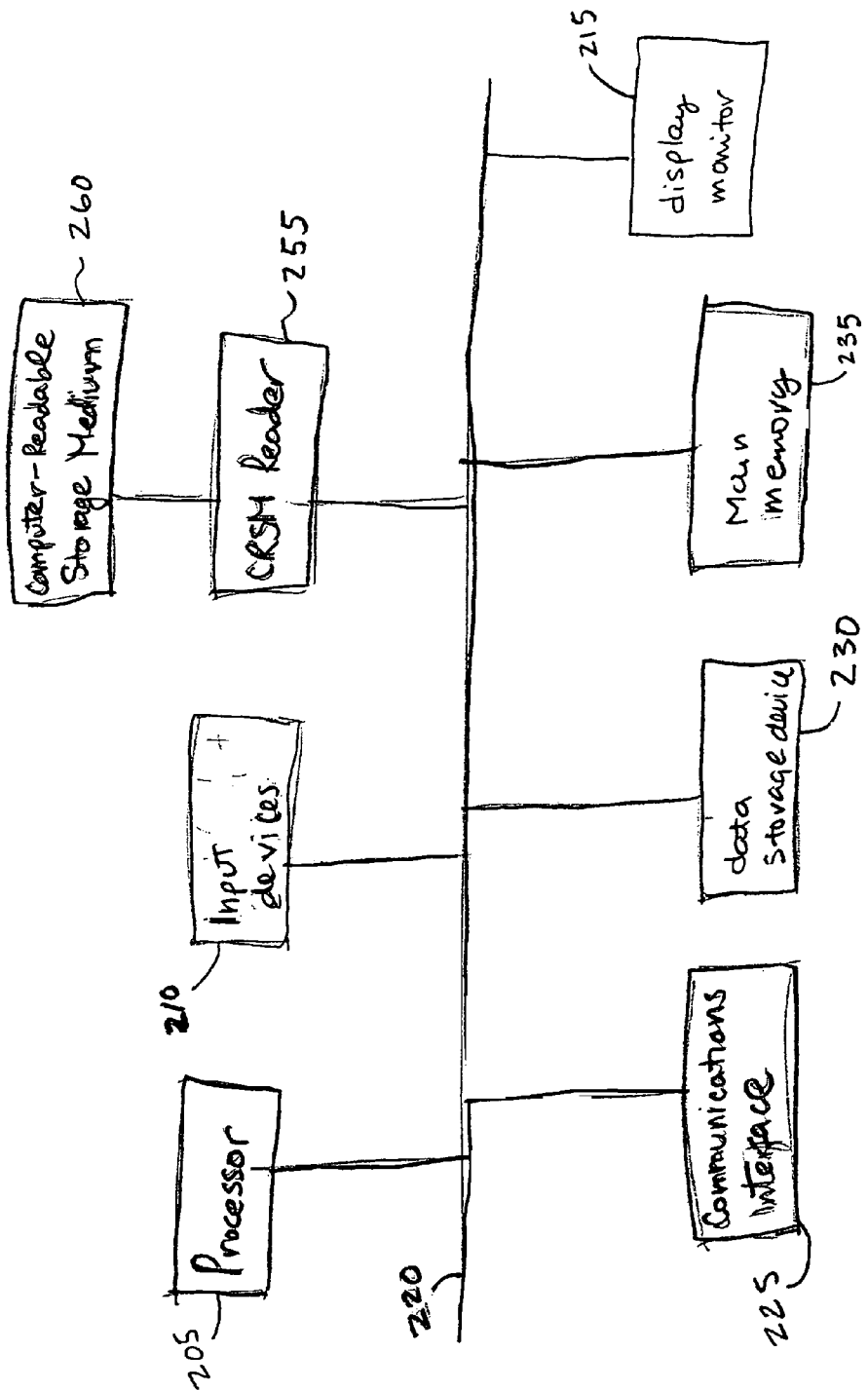
FIG. 2 shows a schematic diagram of a computer that may be used in the present invention.

FIG. 2 is a schematic diagram of a computer that may be used in the present invention. The computer of FIG. 2 includes a processor 205, such as an Intel Pentium™ microprocessor or a Motorola Power PC™ microprocessor, coupled to a bus 220. The computer further includes input devices 210 such as a keyboard and mouse, a display monitor 215 such as a cathode ray tube or flat panel display, a communications interface 225 such as an Ethernet card or a modem, a data storage device 230 such as a magnetic disk, and main memory 235 such as Dynamic Random-Access Memory (DRAM), each coupled to bus 220. Bus 220 may be coupled to a computer network such as network 101 via communications interface 225. Persons of ordinary skill in the art will recognize that the computer of FIG. 2 may also include additional components, such as sound cards, multimedia cards, additional memory, additional processors, input/output lines for transferring information across a hardware channel etc. Also, program codes and data may be received by and stored in the computer in alternative ways. For example, a computer-readable storage medium (CRSM) reader 255 such as a magneto-optical reader, CD-ROM drive, floppy drive, and high density removable drive may be coupled to bus 220 for reading a computer-readable storage medium (CRSM) 260 such as a magnetic disk, floppy disk, a hard disk, a magneto-optical disk, smart cards etc. Accordingly, the computer may receive program codes and data via CRSM reader 255.

Referring back to FIG. 1, a website 103 includes one or more web pages 131 and a web server 132. As can be appreciated, website 103, and other server computers in the present disclosure, may be implemented using any appropriately configured computer including server computers available from Sun Microsystems™, the Hewlett-Packard Company™, or International Business Machines™. Web pages 131 may include any information accessible over a network. In this embodiment, web pages 131 are of the type generally available over the Internet for browsing. For example, a web page 131 may be an HTML (HyperText Markup Language) file containing news, maps, coupons, offer for services, directories, for sale merchandize, and other types of information that will attract end-users to website 103. A web server 132 includes program code that allows website 103 to communicate with a client computer over network 101.

As shown in FIG. 1, one or more message server computers 104 are also coupled to network 101. In this embodiment, a message server computer 104 may be any type of computer capable of sending one or more messages 141 that contain information for display on a client computer 102. In this embodiment, a message 141 may contain advertising information. However, the present invention is not so limited and may be used for presenting any type of information. For example, a message 141 may contain information forewarning end-users of emergency or scheduled network outages. As another example, a message 141 may contain information for alerting an end-user that someone on network 101 wants to communicate with her by voice over IP (Internet Protocol) or on-line chat. Messages 141 are further described later on below in connection with FIG. 7.

A message server computer 104 also includes a message server system 142, which includes program code that allows the message server computer 104 to communicate with a client computer over network 101. Specifically in this embodiment, client computer 102 communicates with a message server computer 104 using a client-server type protocol.

As can be appreciated by those of ordinary skill in the art, the present invention is not limited to any specific type of messaging system. In another embodiment, the method and associated system for generating, transporting, and processing messages disclosed in U.S. Provisional Application No. 60/301,888, entitled "SYSTEM AND METHOD FOR USING CONTINUOUS MESSAGING UNITS IN A NETWORK ARCHITECTURE," filed on Jun. 29, 2001, by Eugene Veteska and Tony Martin, are employed. The just mentioned provisional application is incorporated herein by reference in its entirety. In another embodiment, a message server computer is not employed; instead, messages containing information to be presented to the end-user are internally generated in client computer 102.

Figure 3:
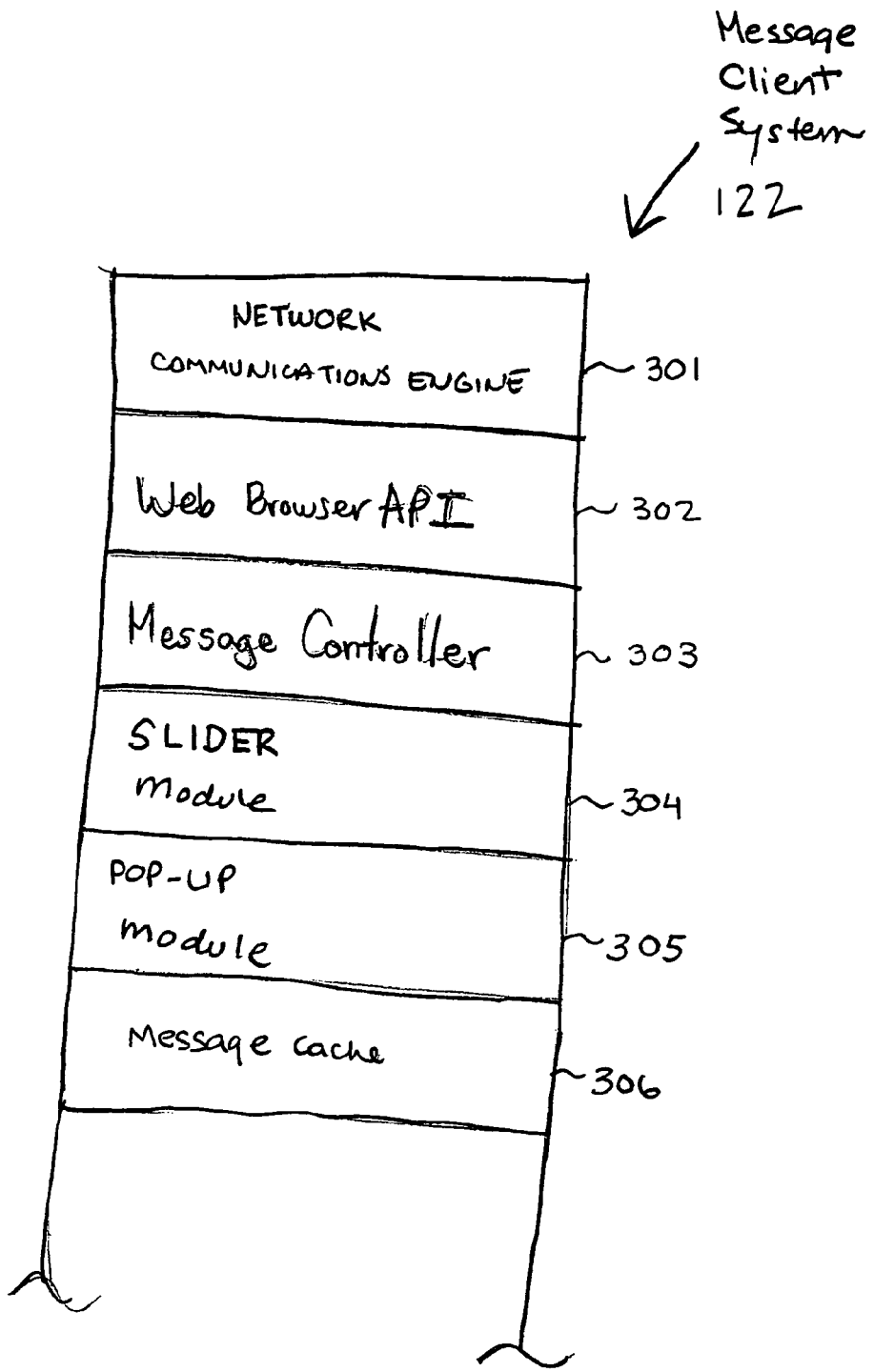
FIG. 3 shows a schematic diagram of a message client system in accordance with an embodiment of the present invention.

Referring to FIG. 3, there is shown a message client system 122 in accordance with an embodiment of the present invention. A network communications engine 301 includes program code for communicating with other computers on network 101. Specifically in this embodiment, network communications engine 301 interfaces with message server system 142 to allow client computer 102 to receive messages 141 from message server computer 104. Of course, like all the program codes in the present disclosure, network communications engine 301 may also include hardware components and supporting program code to perform its function. For example, network communications engine 301 may include a communications interface card 225, a TCP/IP stack, and associated device drivers.

A web browser application programming interface (API) 302 includes program code for allowing message client system 122 to communicate with web browser 121. In this embodiment, web browser API 302 monitors communications to and from web browser 121. This allows web browser API 302 to know the website 103 the end-user is currently on (or the web page 131 the end-user is currently viewing), and pass that knowledge to a message controller 303. Utilizing network communications engine 301, message controller 303 can then request message server computer 104 to provide client computer 102 the messages 141 most appropriate for that website 103. For example, when web browser API 302 determines that web browser 121 is currently pointing to a URL (uniform resource locator) of an on-line bookstore, message controller 303 is triggered to request message server computer 104 for messages 141 relating to books. The resulting messages 141 received in client computer 102 and provided to the end-user may include advertising information about newly released books, discounted books, other bookstore websites, etc.

Information contained in each message 141, hereinafter referred to as "message information," may be presented to the end-user in various display formats. Accordingly, besides program code for requesting messages 141 from message server computer 104, message controller 303 also includes program code for routing a message 141 to the appropriate display format module (e.g., slider module 304, pop-up module 305).

Figure 4B:
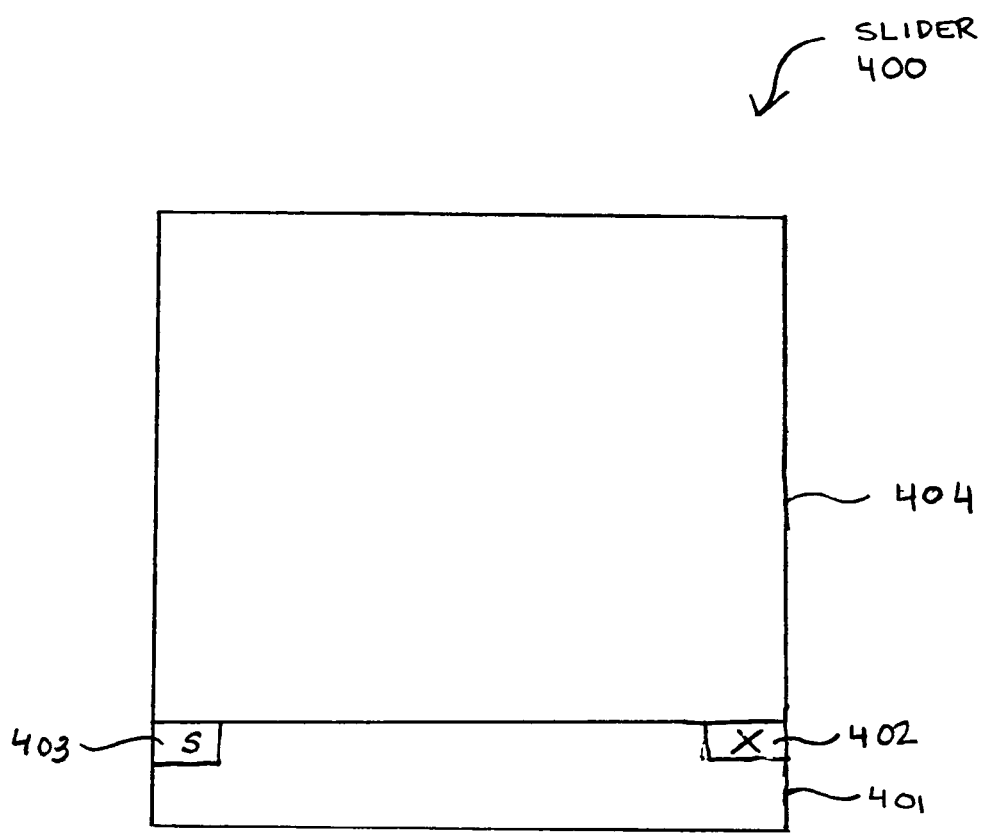
FIGS. 4A and 4B show a slider display format in accordance with an embodiment of the present invention.
Figure 4A:
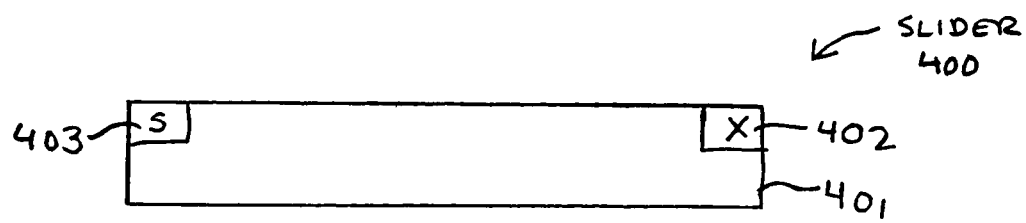

In this embodiment, a slider module 304 includes program code for receiving, processing, and displaying message information. FIGS. 4A and 4B show a slider 400, which is a display format in accordance with an embodiment of the present invention. Slider 400 displays message information for viewing by the end-user. Slider 400 includes a caption area 401 where a portion of the message information is displayed. In this embodiment, caption area 401 includes text information. In other embodiments, caption area 401 includes rich content (e.g., animation, photo, video). As shown in FIG. 4B, slider 400 further includes a slider window area 404 where another portion of the message information is displayed. For example, in a message information that reads, "Save 5$ On Best Sellers. Buy five books at discountbooks.com before Dec. 25, 2001 and receive a $5 discount. We have lots of books to choose from. Buy now and save."

caption area 401 may include the text "Save 5$ On Best Sellers," while slider window area 404 may include the text "Buy five books at discountbooks.com before Dec. 25, 2001 and receive a $5 discount. We have lots of books to choose from. Buy now and save."

In this embodiment, only caption area 401 is initially presented to the end-user. That is, slider 400 initially has the display format shown in FIG. 4A. Thus, in the bookstore example, the end-user will only see "Save 5$ On Best Sellers" when she first navigates to the website relating to books. Preferably, caption area 401 only has enough information to attract the end-user's attention, or provide a hint of the information contained in slider window area 404.

In this embodiment, caption area 401 is designed to have minimal information in order to occupy a small amount of display area. This allows caption area 401 to be presented to the end-user without severely disrupting the end-user's current activity. For example, a slider 400 with only caption area 401 (see FIG. 4A) may be displayed near an edge of a display monitor, thereby allowing caption 401 to be presented to the end-user without totally blocking the end-user's view of her web browser. This is in marked contrast to conventional display formats, which occupy a relatively large display area in the middle of the end-user's display monitor.

Once caption area 401 is displayed, slider window area 404 can thereafter be presented to the end-user. In one embodiment, slider window area 404 is presented to the end-user within a predetermined amount of time after caption area 401 is presented, and then closed after a predetermined amount of time. This advantageously allows presentation of the message information to the end-user without requiring the end-user to act on the slider (e.g., click on the slider). Further, by closing slider window area 404 after a predetermined amount of time, the end-user can simply ignore the message information if it does not interest her. This is in marked contrast to conventional display formats that have to be removed by the end-user.

In one embodiment, slider window area 404 is closed when the end-user navigates to a website or views another web page not pertinent to the current message information. In the bookstore example, the slider window area 404 containing the message about discounted books closes when the end-user navigates to a website relating to cars. At that point, the message information contained in both caption area 401 and slider window area 404 may be replaced by another message information, which is more pertinent to cars. In one embodiment, slider 400 (i.e., both caption area 401 and slider window area 404) goes away when the end-user navigates to another website or views another web page.

As shown in FIG. 4A, caption area 401 further includes a remove control button 402 and a save control button 403. Clicking (i.e., pointing a mouse cursor and pressing a button) on save control button 403 saves the current message information in a buffer so that it may be recalled at a later time more convenient to the end-user. This prevents the message information from getting lost in case the end-user goes to another website, or is currently too busy working on a more important activity. In the bookstore example, clicking on save control button 403 saves the current message information about book discounts. At a later time, the end-user can retrieve the saved message information using a conventional user interface not specifically shown. As can be appreciated, the saving and retrieval of information, in general, are known in the art and will not be further described here.

Clicking on remove control button 402 removes slider 400 from the display monitor. Control button 402 gives the end-user the option to remove slider 400 when she is not interested in viewing any message information.

Figure 5A:
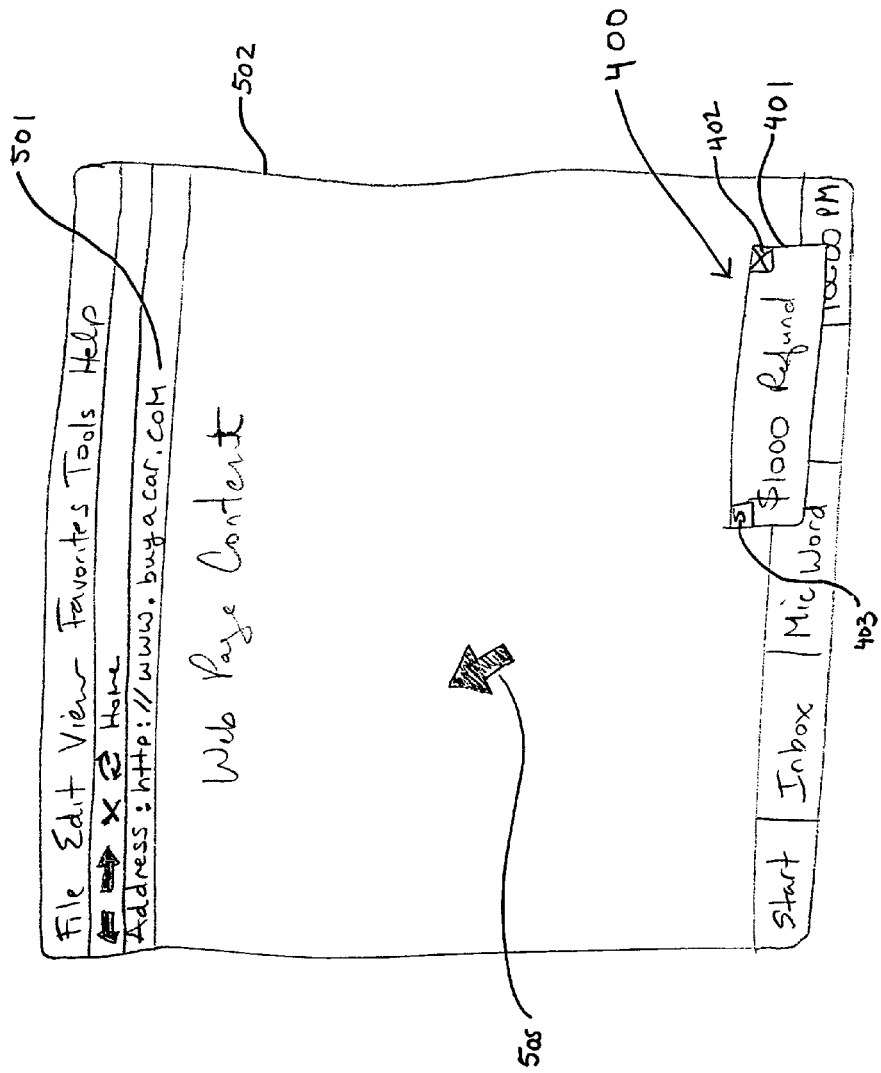
FIGS. 5A-5D illustrate an example application where a slider display format is used in accordance with an embodiment of the present invention.

FIGS. 5A-5D illustrate an example application where a slider display format is used in accordance with an embodiment of the present invention. In FIG. 5A, a caption area 401 of a slider 400 displays the text information "$1000 Refund" over a web browser 502, which is currently pointed to the website of a car dealership (see URL 501). At any time thereafter, the end-user can choose to remove slider 400 by clicking on remove control button 402. It should be understood that although slider 400 is depicted in FIGS. 5A-5D as being separate from browser 502, slider 400 may also be integrated with browser 502 as part of the HTML code of a web page, for example.

Figure 5B:
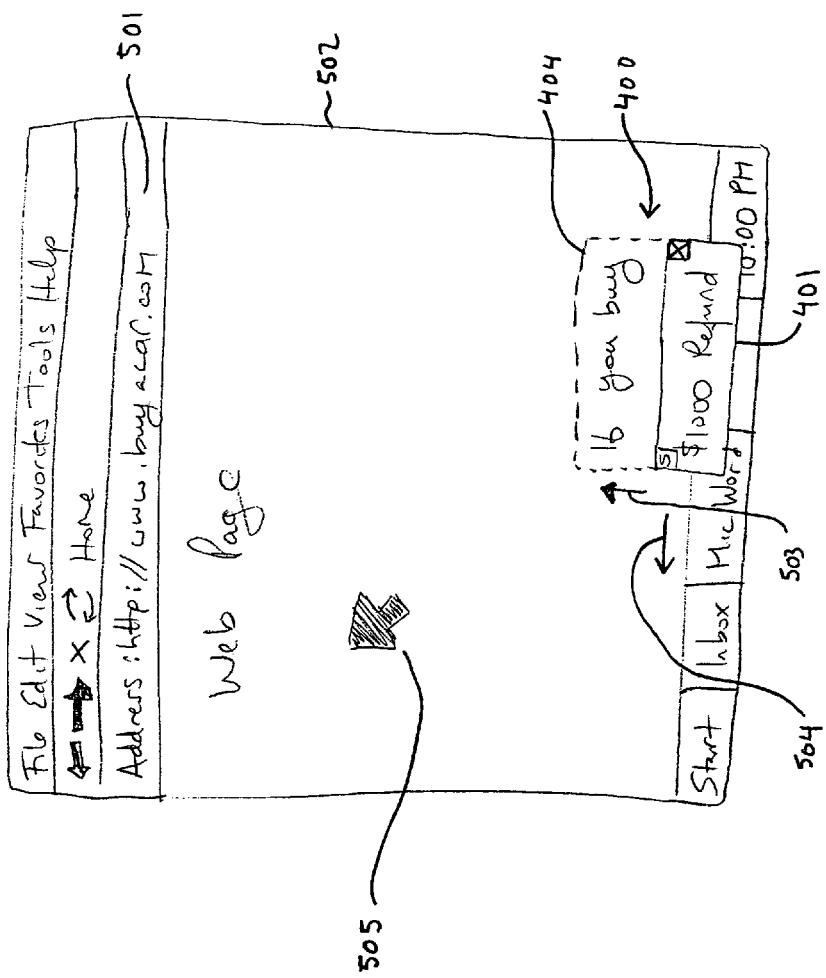

FIG. 5B depicts a slider window area 404 as it begins to appear some time after browser 502 is pointed to URL 501. In this embodiment, slider window area 404 "slides out" of caption area 401 in the direction indicated by arrow 503. As can be appreciated, slider window area 401 may slide out in any direction. For example, slider window area 401 may also slide out in the direction indicated by arrow 504. Moreover, slider window area 404 may be presented to the end-user in any manner; it does not have to slide out of caption area 401. For example, slider window area 404 may be instantly displayed in its entirety, displayed in portions, animated-in, focused-in, popped-in etc.

Figure 5C:
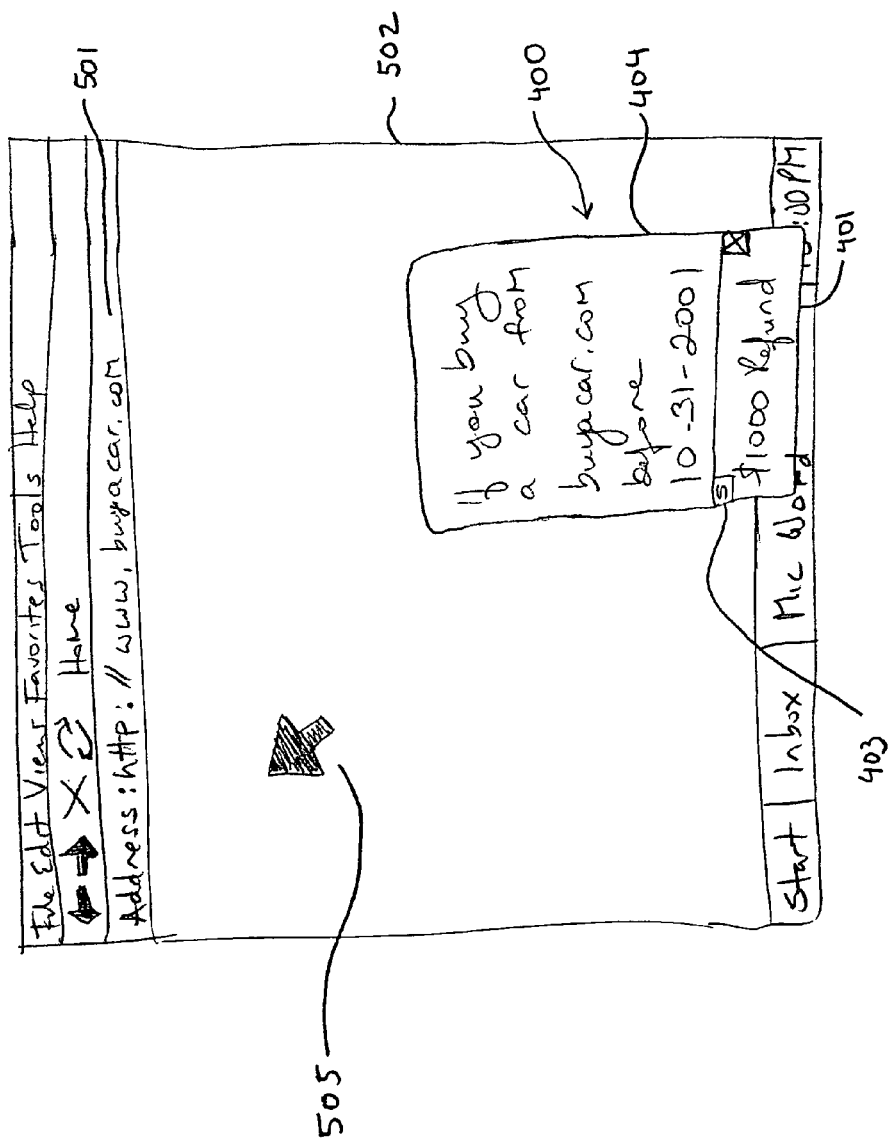

FIG. 5C depicts a fully expanded slider window area 404. If the end-user is interested in the displayed information, she may click on slider window area 404 to get further details. In this example, clicking on slider window area 404 may provide the end-user with an electronic coupon, may bring-up another window containing more information, may show the end-user another website, etc. If the end-user is interested in the displayed information but is currently too busy, she may click on save control button 403 to save the message information for later retrieval.

Figure 5D:
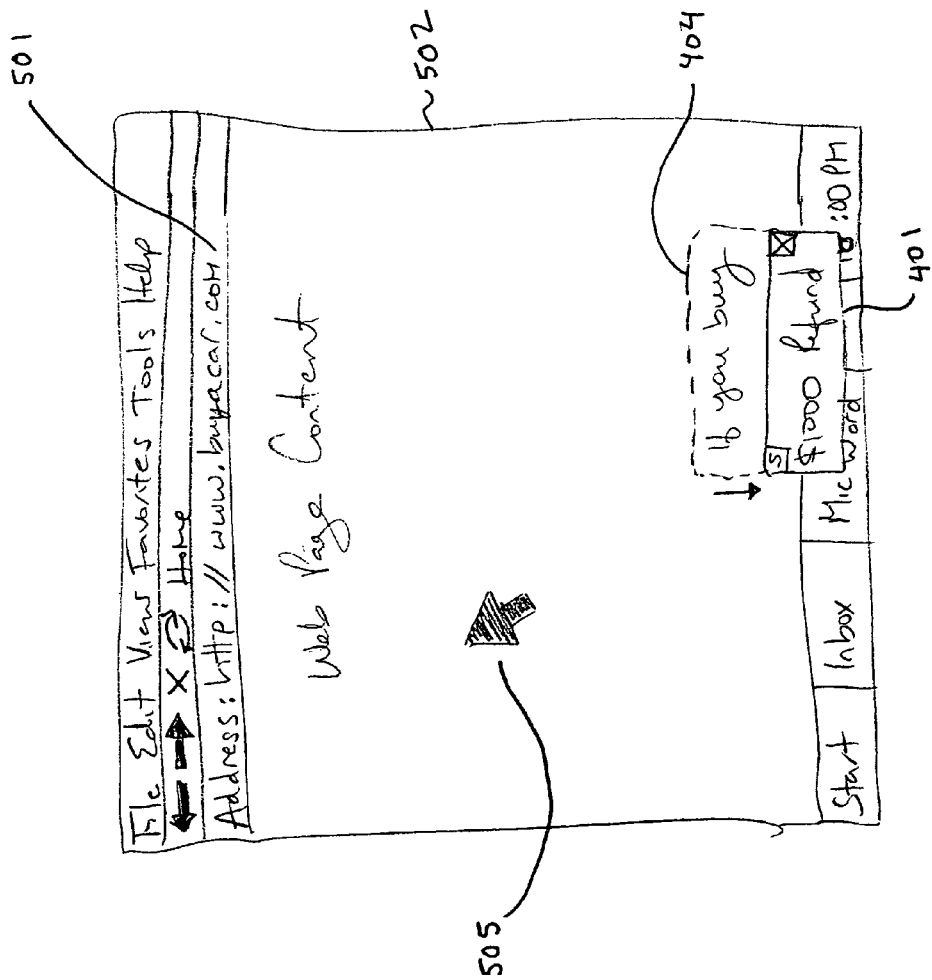

If the user does not click on an area of slider 400 after a predetermined amount of time, slider window area 404 will politely close as shown in FIG. 5D. While browser 502 remains pointed to the same website or web page (or a range of URLs), slider window area 404 may be displayed again by placing mouse cursor 505 over caption area 401 (with or without clicking).

As can be appreciated, the present invention may be used in any application requiring presentation of information to an end-user. In an inter-office network, for example, a slider 400 may be used to announce employee training schedules. In that example, caption area 401 may read, "Training Courses For Next Week,"

while slider window area 404 may read,

"(1) Introduction To Word Processing—Sep. 4, 2001, 10:00-5:00—Training Room A;

(2) First Aid Class—Sep. 5, 2001, 1:00-3:00—Training Room B;

(3) Essentials Of Middle Management—Sep. 5, 2001, 4:00-6:00—Training Room B; . . . "

Other applications will be readily apparent to persons of ordinary skill in the art reading the present disclosure.

Figure 6:
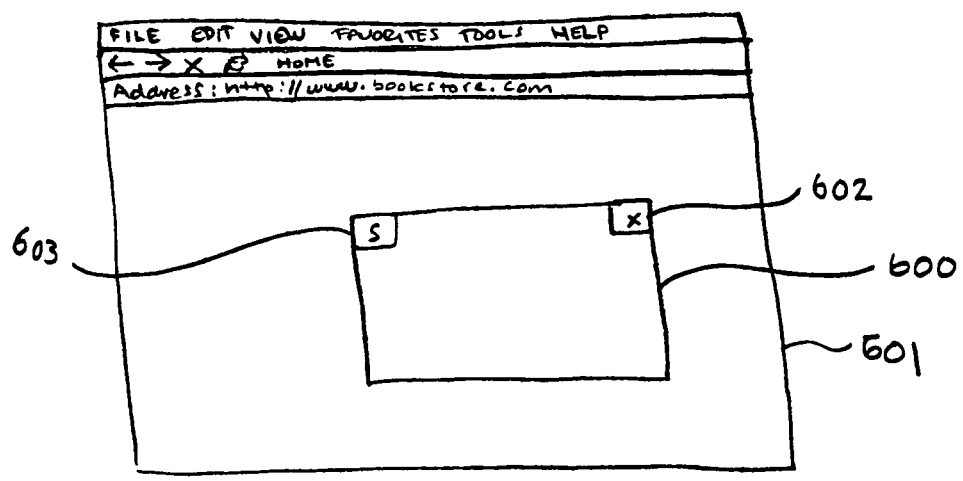
FIG. 6 shows a pop-up display format in accordance with an embodiment of the present invention.

Referring back to FIG. 3, message client 122 further includes a pop-up module 305. Pop-up module 305 includes program code for receiving messages from message controller 303. Pop-up module 305 processes a received message and displays the message information contained therein in pop-up display format. FIG. 6 shows a pop-up 600, which is in a pop-up display format in accordance with an embodiment of the present invention. Pop-up 600 includes a save control button 603 for saving the message information in a buffer, and a remove control button 602 for removing pop-up 600. Pop-up 600 may be displayed overlying a web browser 601 in the middle of the display monitor. Pop-up 600 may also be displayed anywhere on the display monitor, including near an edge. In this embodiment, pop-up 600 has only one display area containing the entirety of the message information. Of course, links to web pages or websites may be included in the display area of pop-up 600.

Display format modules other than slider module 304 and pop-up module 305 may also be employed in the present invention.

As shown in FIG. 3, message client system 122 further includes a message cache 306. Message cache 306 buffers messages 141 received from message server computer 104 (see FIG. 1). This allows client computer 102 to have several messages 141 at any given time. In one embodiment, message cache 306 contains a message 141 relating to the current website or web page, and additional messages 141 relating to similar websites or web pages. For example, message cache 306 may contain a message 141 relating to books when the end-user is browsing the catalog of an on-line bookstore, and additional messages 141 relating to movies that may also be available from that on-line bookstore. This way, a message 141 relating to movies can be routed to the appropriate display format module as soon as the end-user navigates to a movies-related web page.

Figure 7:
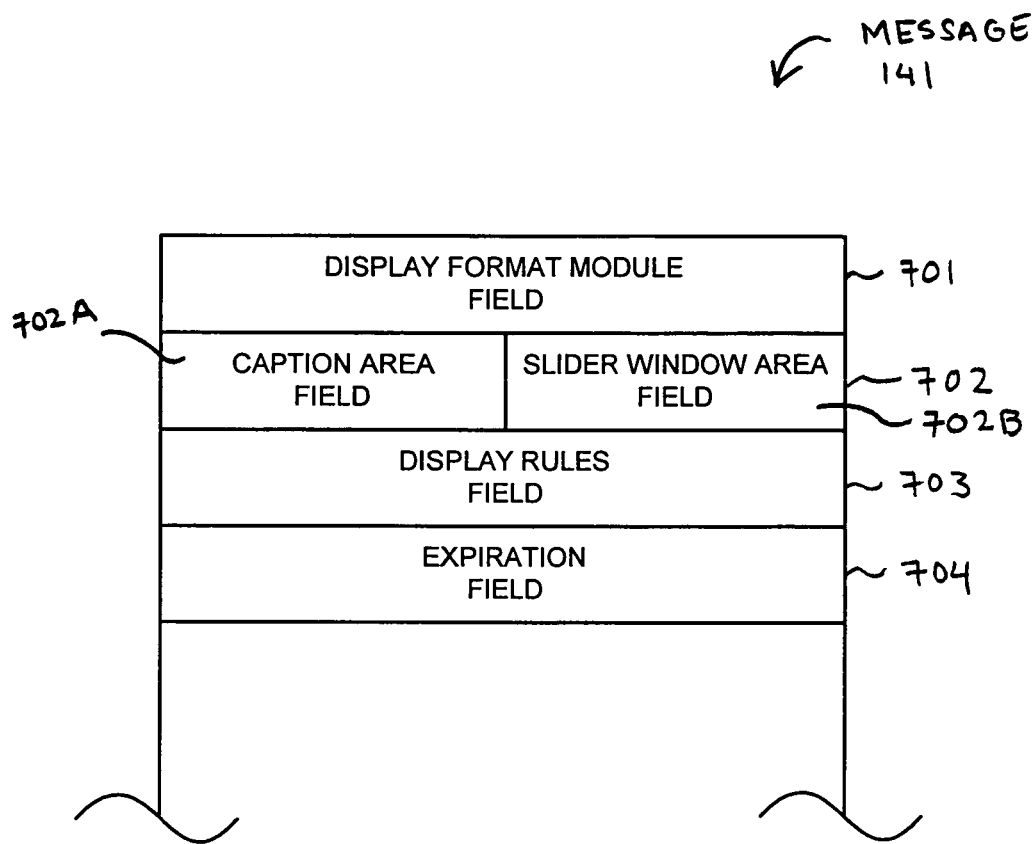
FIG. 7 shows a schematic diagram of a message in accordance with an embodiment of the present invention.

FIG. 7 shows a message 141 in accordance with an embodiment of the present invention. Message 141 may be implemented using any type of data structure. Message 141 includes a display format module field 701 indicating the display format to be used for the accompanying message information. The message information is contained in a message information field 702. For sliders, message information field 702 further includes a caption area field 702A containing a portion of the message information, and a slider window area field 702B containing another portion of the message information. Optionally, the message information may be divided into several portions, with each portion being contained in its own message 141 and separately transmitted to client computer 102.

A display rules field 703 contains a set of rules for displaying the message information. In one embodiment, display rules field 703 includes a rule specifying when to present the message information to the end-user. An example of such a rule is to present the message information to the end-user if she is viewing a certain web page on a certain website. In the bookstore example discussed above, a display rule may be specified such that the message information relating to discounted books will be shown to the end-user when her browser is pointed to the specific URL address "http://www-.bookstore.com/". Display rules field 703 may also be left blank to indicate that the message information must be displayed immediately. This is advantageous in situations where the message information is regarding an emergency (such as a network outage) or is a notification that somebody on the network is trying to get a hold of the end-user, for example.

An expiration field 704 indicates the date and time when the message 141 is to be purged from message cache 306 (see FIG. 3). Periodically, message controller 303 searches message cache 306 for expired messages 141 and purges them. This not only conserves storage space in client computer 102, but also prevents old message information from being presented to the end-user. Such old message information may be contained in messages 141 received in client computer 102 some time ago but has not been presented to the end-user because the respective display rules have not been satisfied.

Figure 8:
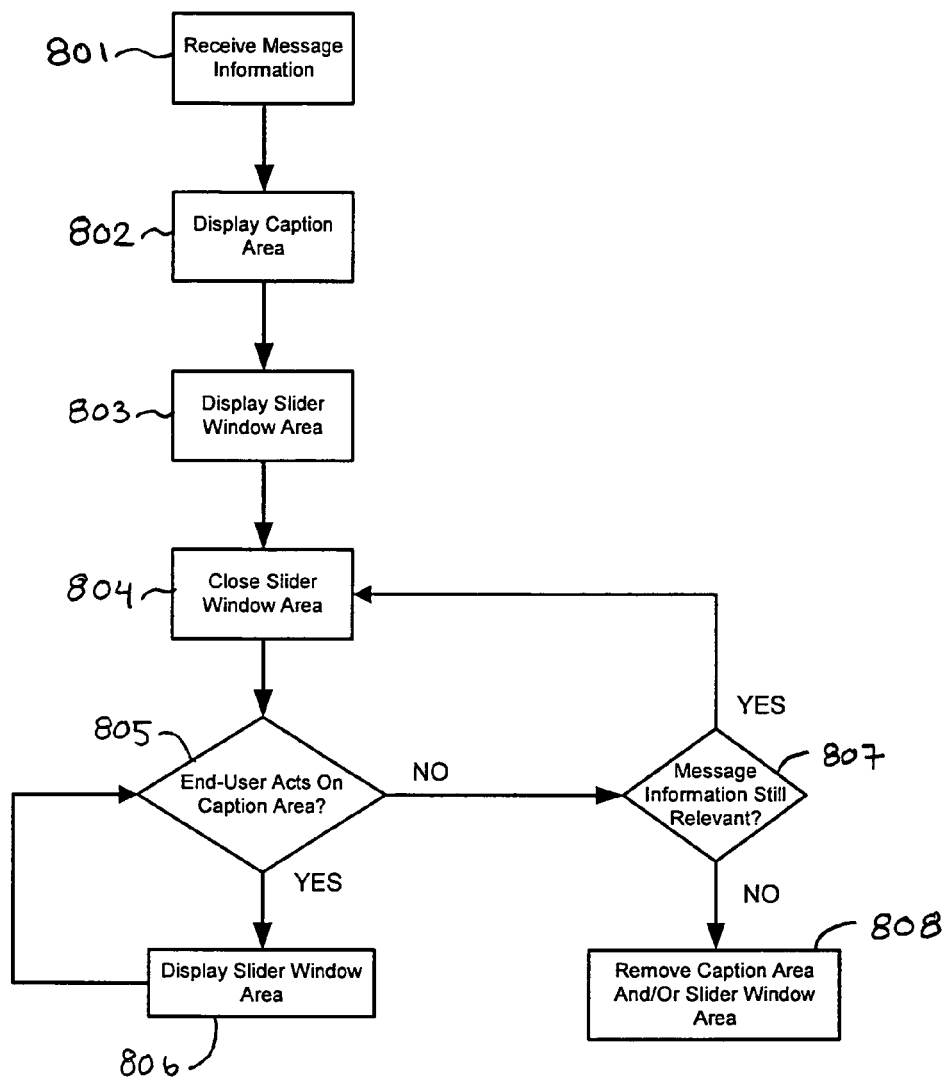
FIG. 8 shows a flow diagram of a method for presenting information in accordance with an embodiment of the present invention.

Referring to FIG. 8, there is shown a method for presenting information in accordance with an embodiment of the present invention. As can be appreciated, the method of FIG. 8 may be implemented in software, hardware, firmware, or combinations thereof.

All. In action 801, message information to be presented to an end-user is received. In this embodiment, the message information is received by a slider display format module running in a client computer, and is part of a message (e.g., packet, datagram, a data unit, data structure) received from a remotely located message server computer. The message information may be provided by any source and by any means without detracting from the merits of the present invention.

In action 802, a caption area containing a first portion of the message information is displayed. In this embodiment, the caption area is displayed in response to the end-user navigating to a certain web page of a certain website. In other embodiments, the caption area is immediately displayed as soon as the message information is received by the display format module. The caption area may display text, rich content, or a combination of both. At any time after action 802, the end-user may save or discard the message information by clicking on a control button within the caption area.

In action 803, a slider window area containing a second portion of the message information is displayed. In this embodiment, the slider window area is displayed after a predetermined amount of time, which may be configured by the end-user or hard-coded in the display format module. The slider window area may also be displayed at any time after action 802 by having the end-user click on or place a cursor over the caption area.

In action 804, the slider window area is closed. In this embodiment, the slider window area is closed after a predetermined amount of time, which may be configured by the end-user or hard-coded in the display format module. In other embodiments, the slider window area is closed by having the end-user click anywhere on the caption area.

As indicated in actions 805 and 806, the slider window area is re-displayed when the end-user acts on it by clicking on or placing a cursor over the caption area.

As indicated in actions 805, 807, and 804, the slider window area remains closed as long as the message information remains relevant and the end-user has not acted on the caption area. In this embodiment, the message information remains relevant if it still relates to the current web page, the message containing it has not expired, or its display rule specifies that it should remain available.

As indicated in actions 805, 807, and 808, the caption area and/or the slider window area are removed from the end-user's display monitor when the end-user has not acted on the caption area and the message information is no longer relevant.

An improved technique for presenting information has been disclosed. While specific embodiments have been provided, it is to be understood that these embodiments are for illustration purposes and not limiting. For example, components described herein as program code may also be implemented in hardware or firmware. Many additional embodiments will be apparent to persons of ordinary skill in the art reading this disclosure. Thus, the present invention is limited only by the following claims.

What is claimed is:

1. A computer-implemented method of presenting information at a computer device that includes a display device, the method being implemented by hardware in combination with software, the method comprising:
   receiving, at the computer device, a message comprising:
      first message information,
      second message information,
      display format information comprising a display formats in which the first message information and the second message information are to be displayed,
      display rules information comprising a display condition in which the first message information and second message information are to be displayed, and
      expiration information comprising a predefined point in time at which the message is to be purged from a message cache;
   selectively displaying the first message information in a first content area of the display device,
      wherein, absent a user action in the first content area while the first message information is being displayed in the first content area, the first content area is closed after a predetermined amount of time;
   displaying the second message information in a second content area of the display device in response to the user action in the first content area while the first message information is being displayed in the first content area.

2. The method of claim 1, wherein the second content area is adjacent to an edge of the first content area, and the second content area slides out of the edge of the first content area.

3. The method of claim 1, wherein the user acts on the first content area by placing a cursor over the first content area.

4. The method of claim 1, wherein the user acts on the first content area by clicking on the first content area.

5. A computer-implemented method of presenting information at a computer device having a display, the method being implemented by hardware in combination with software, the method comprising:
   receiving, at the computer device, a message comprising:
      first message information,
      second message information,
      display format information comprising a display formats in which the first message information and the second message information are to be displayed,
      display rules information comprising display condition in which the first message information and second message information are to be displayed, and
      expiration information comprising a predefined point in time at which the message is to be purged from a message cache;
   selectively displaying the first message information in a first content of the display,
      wherein, absent a user action in the first content area while the first message information is being displayed in the first content area, the first content area is closed after the predetermined amount of time; and
   displaying the second message information in a second content area of the display that is larger than the first content area in response to a user action in the first content area while the first message information is being displayed in the first content area.

6. The method of claim 5, wherein the second content area is adjacent to an edge of the first content area, and the second content area slides out of the edge of the first content area.

7. The method of claim 5, wherein the message information is stored in a message cache prior to being displayed.

8. A computer-implemented method for presenting information to an end-user over a network, the method being implemented by hardware in combination with software, the method comprising:
   receiving, at a client computer device having a display associated therewith, a message comprising:
      notification message information for a user of the computer device,
      display format information comprising a display formats in which a first message information and a second message information are to be displayed,
      display rules information comprising A display a condition in which the first message information and second message information are to be displayed, and
      expiration information comprising a predefined point in time at which the message is to be purged from a message cache;
   selectively displaying a first portion of the notification message information on a first display area of the display;
   closing the first display area after a first predetermined amount of time, wherein the predetermined amount of time is configurable on the computer device; and
   displaying another portion of the notification message information on a second display area of the display in response to at least one user action while the first portion of the notification message information is being displayed on the first display area.

9. The method of claim 8, further comprising:
   closing the second display area within a predetermined amount of time after the second display area is displayed.

10. The method of claim 8, further comprising:
    closing the second display area in response to the user navigating to another website.

11. The method of claim 8, wherein the first display area and the second display area are in a web page.

12. The method of claim 8, wherein the first display area and the second display area are separate from a web browser.

13. The method of claim 1, wherein the display format information indicates a plurality of display formats in which the first message information and the second message information are to be displayed.

14. The method of claim 13, wherein the plurality of display formats include a pop-up format and a slider format.

15. The method of claim 1, wherein the display rules information indicates a predetermined web page configured to display the first message information and second message information in response to a browser used by the user on the computer device is pointed to the predetermined web page.

16. The method of claim 1, wherein the display rules information indicates the first message information is to be displayed immediately.

17. The method of claim 16, further comprising:
displaying the first message information in response to the receiving the display rules information indicating that the first message information is to be displayed in response to the receiving the message.

18. The method of claim 1, wherein the expiration information indicates a predefined day and a predefined time of the predefined day at which the message is to be purged from the message cache.

19. The method of claim 11, wherein the display format information indicates a plurality of display formats in which the first message information and the second message information are to be displayed.

20. The method of claim 19, wherein the plurality of display formats include a pop-up format and a slider format.

21. The method of claim 5, wherein the display rules information indicates a predetermined web page configured to display the first message information and second message information in response to a browser used by the user on the computer device is pointed to the predetermined web page.

22. The method of claim 5, wherein the display rules information indicates the first message information is to be displayed in response to the receiving the message.

23. The method of claim 22, further comprising:
displaying the first message information in response to the receiving the message having the display rules information indicating that the first message information is to be displayed in response to the receiving the message.

24. The method of claim 5, wherein the expiration information indicates a predefined day and a predefined time of the predefined day at which the message is purged from the message cache.

25. The method of claim 8, wherein the display format information indicates a plurality of display formats in which the first portion of the notification message information and the second portion of the notification message information are to be displayed.

26. The method of claim 25, wherein the plurality of display formats include a pop-up format and a slider format.

27. The method of claim 8, wherein the display rules information indicates a predetermined web page configured to display the portions of the notification message information in response to a browser used by the user on the client computer device is pointed to the predetermined web page.

28. The method of claim 8, wherein the display rules information indicates the first message information is to be displayed in response to the receiving the message.

29. The method of claim 28, further comprising:
displaying the first message information in response to the receiving the message having the display rules information indicating that the first message information is to be displayed in response to the receiving the message.

30. The method of claim 8, wherein the expiration information indicates a predefined day and a predefined time of the predefined day at which the message is to be purged from the message cache.

* * * * *

UNITED STATES PATENT AND TRADEMARK OFFICE
CERTIFICATE OF CORRECTION

PATENT NO. : 8,521,827 B2
APPLICATION NO. : 10/061107
DATED : August 27, 2013
INVENTOR(S) : Martin It is certified that error appears in the above-identified patent and that said Letters Patent is hereby corrected as shown below:

On Title Page 3, item (56), under "OTHER PUBLICATIONS", in Column 1, Line 30, delete "intemet:" and insert -- internet: --, therefor.

On Title Page 3, item (56), under "OTHER PUBLICATIONS", in Column 1, Line 36, delete "Probalistic" and insert -- Probabilistic --, therefor.

On Title Page 3, item (56), under "OTHER PUBLICATIONS", in Column 2, Line 11, delete "Wrtitten" and insert -- Written --, therefor.

On Title Page 3, item (56), under "OTHER PUBLICATIONS", in Column 2, Line 39, delete "intemet." and insert -- internet: --, therefor.

In the Specification:

In Column 1, Line 11, delete "COLLECTIG" and insert -- COLLECTING --, therefor.

In Column 2, Line 25, delete "DESCRIPTION" and insert -- BRIEF DESCRIPTION --, therefor.

In Column 3, Line 8, delete "Explore™" and insert -- Explorer™ --, therefor.

In Column 6, Line 40, delete "window area 401" and insert -- window area 404 --, therefor.

In Column 6, Line 41, delete "window area 401" and insert -- window area 404 --, therefor.

In Column 8, Line 28, delete "All. In" and insert -- In --, therefor.

Signed and Sealed this
Thirteenth Day of May, 2014

Michelle K. Lee
*Deputy Director of the United States Patent and Trademark Office*

CERTIFICATE OF CORRECTION (continued)
U.S. Pat. No. 8,521,827 B2

In the Claims:

In Column 9, Lines 26-27, in Claim 1, delete "formats" and insert -- format --, therefor.

In Column 9, Lines 59-60, in Claim 5, delete "formats" and insert -- format --, therefor.

In Column 9, Line 62, in Claim 5, delete "comprising display" and insert -- comprising a display --, therefor.

In Column 10, Lines 26-27, in Claim 8, delete "formats" and insert -- format --, therefor.

In Column 10, Lines 29-30, in Claim 8, delete "A display a condition" and insert -- a display condition --, therefor.